United States Patent [19]

Ojima et al.

[11] Patent Number: 4,466,802
[45] Date of Patent: Aug. 21, 1984

[54] TENSION PROVIDING MECHANISM

[75] Inventors: Juji Ojima, Ebina; Keiichi Suzuki, Yokohama, both of Japan

[73] Assignee: NHK Spring Co., Ltd., Yokohama, Japan

[21] Appl. No.: 239,990

[22] Filed: Mar. 3, 1981

[51] Int. Cl.³ .................. F16H 7/22; F16H 7/12; F16D 65/38

[52] U.S. Cl. ........................ 474/138; 474/140; 474/111; 188/196 F; 188/196 V

[58] Field of Search ............... 474/111, 140, 136, 138; 74/99 A; 188/196 F, 196 V

[56] References Cited

U.S. PATENT DOCUMENTS

| 968,377 | 8/1910 | Marco | 188/196 F |
|---|---|---|---|
| 2,539,090 | 1/1951 | Leland | 74/99 A |
| 2,942,580 | 6/1960 | Siravo | 74/99 A |
| 3,358,522 | 12/1967 | Poyser et al. | 474/111 |
| 4,371,360 | 2/1983 | Ojima et al. | 474/140 |

FOREIGN PATENT DOCUMENTS

| 2270493 | of 1975 | France | 474/111 |
| 22309/1966 | 6/1970 | Japan. | |
| 44379 | 4/1977 | Japan | 188/196 F |
| 2052654A | 1/1981 | United Kingdom | 188/196 V |

Primary Examiner—Lawrence J. Staab
Assistant Examiner—Michael D. Bednarek
Attorney, Agent, or Firm—Fleit, Jacobson, Cohn & Price

[57] ABSTRACT

A tension providing mechanism including two shafts, one having an external screw and the other having an internal screw, the shafts being connected by engaging the screwed portions with each other. One of the shafts is supported for axial translation without rotation, and the other shaft is supported for rotation and is restrained from axial sliding. The rotatable shaft includes a torsion spring for applying spring torque in a direction to cause the other shaft to extend in an axial direction against a member, such as a drive chain, in order to increase the tension thereof. A locking mechanism is provided for constraining movement of the rotatable shaft, the locking mechanism being in the form of a lever having one end removably engaged with a split groove provided in the end of the shaft, the other end of the locking mechanism being latched to a projection formed on the case in which the tension providing mechanism is housed.

5 Claims, 4 Drawing Figures

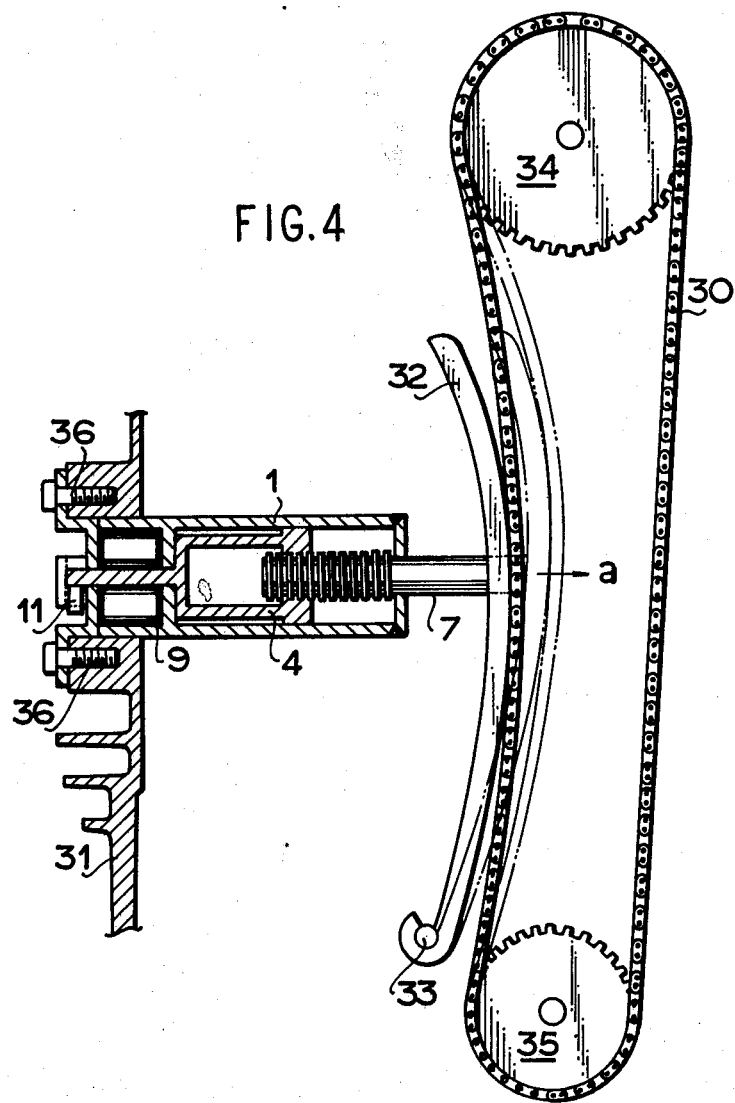

TENSION PROVIDING MECHANISM

BACKGROUND OF THE INVENTION

This invention relates to a tension providing mechanism availing a spring torque. The tension providing mechanism means a mechanism which acts a pushing force in a fixed direction continuously and displays the properties of nearly a rigid body when a reaction force acts thereon. Such mechanism is, for instance, used when the rigid body properties are requested as in such case of pressing a chain, a belt or the like with a force having a fixed direction like a chain tensioner or a belt tensioner etc. or of acting the reacting force against said tensioner.

In other words, the chain tensioner provides a fixed tension to the chain by pressing the chain in a fixed direction when said chain occurs the slackness by elongation or abrasion during the use. In this case, the properties of nearly a rigid body are desirable for the reaction force against the pressing direction.

Heretofore, in chain tensioner, for instance, there exist two types, a type of manual control with manual adjustment according to the elongation of the chain and a type of automatic control. The former is comparatively cheap, but has such defects as difficulty in maintenance and generation of an abnormal sound, while the latter has such defects as the complication of the whole mechanism and high cost since it avails an oil pressure.

Heretofore, there exists a tension providing mechanism having no necessary maintenance (Japanese patent application No. 1966-22309) as shown in FIG. 1. In locking mechanism of this device however, the outer circumference of a piston 21 is only pressed with a push or set screw 27. Accordingly, the locking in the pushing direction (direction shown with an arrow) is uncertain and the screw 27 is apt to fall off. Further, when this device is incorporated into other apparatus, an oil leakage from the screw portion 27 occurs or a crack appears on the sliding surface since the sliding portion of the piston 21 is pressed with a push screw directly, thereby causing a wear. Furthermore, when the pushing screw 27 is incorporated into the device, its controlling is impossible. Therefore, the exposed portion of the device increases, whereby making the device compact is impossible.

Still further, since the locking or unlocking condition of the pushing force in said device can not be confirmed from outside, said device has such defects as taking much time in assembling, incorporation into an apparatus or a periodical inspection and controlling. In FIG. 1, the numeral 22 is a cylinder, 23 is a shoe integrated with a piston 21, 24 is a male screw, 25 is a spiral spring and 26 is a fixed pin.

SUMMARY OF THE INVENTION

This invention is performed in view of the above mentioned conditions and provides a novel tension providing mechanism which can secure a pushing force properly with a very simple mechanism, and has the properties of nearly a rigid body against the reaction force opposing a spring torque which makes the maintenance unnecessary.

Details of this invention will be explained in accordance with an example shown in the drawings.

BRIEF DESCRIPTION OF THE DRAWINGS

FIG. 4 is an explanation view which shows a state applying the device of this invention.

DETAILED DESCRIPTION OF THE INVENTION

Figure 1:
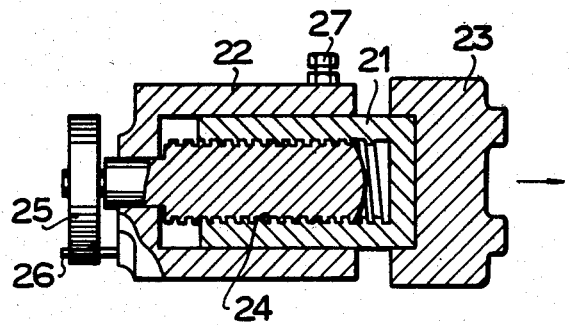
FIG. 1 is a vertical sectional view of a material portion in the conventional example.
Figure 2:
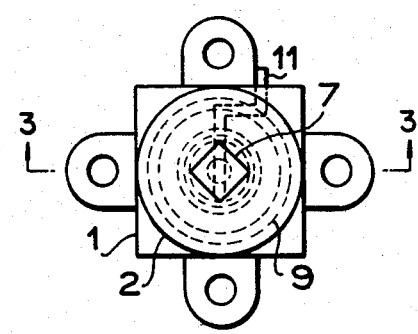
FIG. 2 is a plan view of the tension providing mechanism in accordance with this invention.
Figure 3:
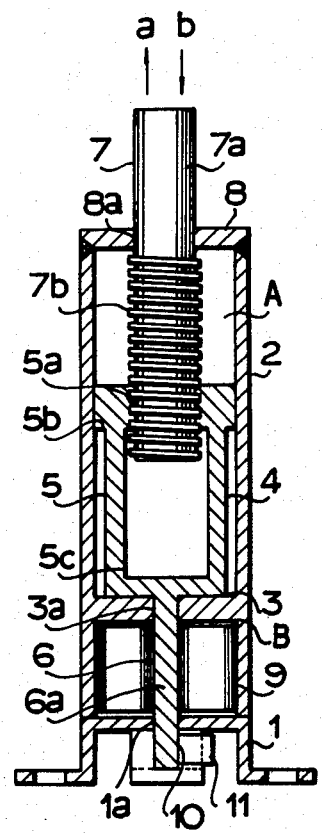
FIG. 3 is a side sectional view taken along line 3—3 of FIG. 2.

The numeral 1 is a supporting stand having a bearing portion 1a thereof. The numeral 2 is a cylindrical case having a nearly H type section, said inner portion being partitioned into upper part, a cave A, and lower part, a spring housing B BY a horizontal dashboard 3 having a bearing portion 3a. The numeral 4 is a first shaft consisted of a head portion 5 having nearly a U type section and an axial portion 6 vertically falls down from the middle portion of a bottom 5C of said head portion 5 to an outward, and at an inner circumference of an open end of said head portion 5, a female screw portion 5a is provided. The numeral 7 is a second shaft consisted of a square pillar portion 7a and a male screw portion 7b screwed with a female screw portion of the first shaft. The numeral 8 is a bearing plate and at the middle portion thereof, a bearing portion 8a adequate to a sectional shape of the square pillar portion 7a of the second shaft is formed. The numeral 9 is a spiral spring.

A cylindrical case 2 is erected on the supporting stand 1. The first shaft 4 is mounted removably in the case 2 inserting the axial portion 6 into the bearing portions 3a and 1a and allowing to slide the outer circumference 5b of the open end of the head portion 5 and the bottom 5c along the inner circumference of the case 2 and the dashboard 3 respectively. Further, a snap ring 10 is secured to the inserting end of its axial portion 6, and thereby the slide in the axial direction is restrained. The second shaft 7 is secured slidably in the axial direction thereof restraining the rotation by screwing the portion 7b having a male portion on the outer circumference thereof with the female portion 5a of the first shaft 4 and inserting said square pillar portion 7a in the bearing portion 8a of the bearing plate or dashboard 8. The inner end of the spiral spring 9 is fixed to the split groove 6a of the first shaft and the outer end thereof is fixed to a suitable position of the case 2, thereby being secured to the spring housing B in the case 2. Further, the numeral 11 is a lever which removably latches one end thereof to the split groove at the axial end of the first shaft which perforates through the supporting stand 1 and another end to a leg portion of the supporting stand 1. When said lever 11 is in this state, the rotation of the first shaft is locked and both latches or either one of said lever 11 is removed and thereby said locking is adapted to be released. Further, in said example, the male and female screw portions are provided on the first and the second shafts respectively. However, this relation between screw and shaft may be reversed.

In the above constitution, after the lever 11 is allowed to push into the split groove 6a of the first shaft and to release the latching between the another end of the lever 11 and the leg portion or the supporting stand 1, the lever 11 is allowed to rotate forcedly in the direction of winding of the spiral spring 9, the first shaft 4 rotates winding the spiral spring 9. The rotation of the first shaft 4 converts into either pushing movement shown with an arrow a or b of the second shaft through the screw portions 5a and 7b. The distinction of the pushing movement in the second shaft between the direction shown with arrows a and b is decided by the left or right screw in the screw portion 5a and 7b, when the force of the forced rotation given to the lever 11 is released, the first shaft 4 rotates in the counter direction against the forced rotation by the action of the spring torque in the spiral spring 9. According to this rotation, the second shaft 7 also indicates a pushing movement in the counter direction against the direction described above.

Further, in case of the pushing movement of the second shaft 7, when a reaction force over said pushing force against the second shaft, said pushing movement stops immediately, but the second shaft 7 will not move in the direction of the reaction force however great it may be. The reason is that since the reaction force acts only in the axial direction of the second shaft 7, the movement of the reaction force shaft 7 in the direction of the reaction force beyond the second portions 5a and 7b is impossible. Therefore, this mechanism has the propperties of nearly a rigid body against the direction of the reaction force. If the reaction force is below the pushing force of the second shaft if any, the second shaft 7 begins the pushing movement in the same direction as the first shaft immediately since the spring torque of the spiral spring always acts on the first shaft 7.

If the above tension providing device is, for instance, set at a given position as a chain tensioner as shown in FIG. 4 and the lever 11 is allowed to be released from locking, the first shaft 4 rotates by aid of the initial torque of the spiral spring 9, whereby the pushing force in the fixed direction is given to the second shaft 7 through the screwed portion. Further, if the elongation or the slackness etc. occurs in chain 30, the second shaft 7 slides in a direction by the torque action of the spiral spring 9, thereby maintaining the chain 30 in tensioning state having no slackness immediately. In FIG. 4, the numeral 31 is a fixed wall, 32 is a shoe positioned at chain 30 so as to abut theron from outside by being supported at one end thereof, 34 and 35 are gears and 36 is a bolt for fixing the device to wall 31. In said device, if a spring having a constant torque in place of the spiral spring 9 is used, the pushing force provided to the second shaft 7 can be maintained always at constant.

According to the tension providing mechanism of this invention, the pushing force can be suitably secured in spite of very simple construction which avails the spring torque. Further, since this device has the properties of nearly a rigid body against the reaction force and the spring torque always acts on the first shaft. Accordingly, this device can always provide a pushing force to the object and makes the maintenance unnecessary. Therefore, when this device is applied to the belt tension or the like, the effect thereof is enormous. Further, in this device, since there exists a locking mechanism which engages the lever connectedly between the split groove of the axial groove in the first shaft and a fixed member, the rotation of the first shaft is surely locked and the sliding surface thereof is not damaged. Furthermore, since the exposure part after setting is limited, it is easy to make compact.

The condition such as locking or unlocking of the pushing force of this invention can be confirmed from outside so easily that this device has such advantages as facility in assembling of the device, incorporation into an apparatus or a periodical inspection controlling etc.

What is claimed is:

1. A tension providing mechanism comprising;

two shafts, a male screw portion formed at one end of one of said shafts and a female screw portion formed at one end of the other of said shafts, said two shafts being connected by engaging said both screw portions with each other, one of said shafts supported for axial translation without rotation;

a first bearing for supporting a first of the two shafts rotatively and for restraining sliding in the axial direction thereof;

a second bearing for supporting a second of the two shafts slidably and for restraining rotation thereof;

means for providing a pushing force in a fixed direction to the second shaft through said screw portions by applying a spring torque in a fixed rotative direction on said first shaft, said means for applying a pushing force comprises a spiral spring having an inner end fixed to a split groove formed in an axial portion of the first shaft and an outer end fixed to the inner wall of the case; and a locking mechanism for constraining movement of said first shaft and being composed of a lever having one end thereof removably engaged with the split groove of the axial end of the first shaft which penetrates through the plate member which blocks the lower end opening of said case and another end latched to a projection formed on said case.

2. A tension providing mechanism comprising:

two shafts, a male screw portion formed at one end of one of said shafts and a female screw portion formed at one end of the other of said shafts, said two shafts being connected by engaging said both screw portions with each other, one of said shafts supported for axial translation without rotation;

a first bearing for supporting a first of the two shafts rotatively and for restraining sliding in the axial direction thereof;

a second bearing for supporting a second of the two shafts slidably and for restraining rotation thereof;

means for providing a pushing force in a fixed direction to the second shaft through said screw portions by applying a spring torque in a fixed rotative direction on said first shaft, said means for applying a pushing force comprises a constant torque spiral spring having an inner end fixed to a split groove formed in an axial portion of the first shaft and an outer end fixed to the inner wall of the case; and a locking mechanism for constraining movement of said first shaft and being composed of a lever having one end thereof removably engaged with the split groove of the axial end of the first shaft which penetrates through the plate member which blocks the lower end opening of said case and another end latched to a projection formed on said case.

3. A tension providing mechanism according to claim 1 or 2 further comprising a cylindrical case for housing said first and second shafts, said case having a partitioned wall therein with a perforated hole extending therethrough which forms said first bearing, a supporting plate member, means for securing the first shaft to the perforated hole through said partitioned wall and the supporting plate member which blocks a lower end opening of said cylindrical case, a second supporting plate member which blocks an upper opening of said cylindrical case and has a perforated hole therethrough forming the second bearing.

4. A tension providing mechanism according to either claim 1 or 2, wherein said first shaft is composed of a cylindrical head portion provided with a bottom having a screw portion at an inner circumference and an axial portion extending from a middle of a bottom of said head portion outwardly, and said second shaft being composed of a square pillar portion and a cylindrical portion having a screw portion at an outer circumference thereof.

5. A tension providing mechanism according to claims 1 or 2 wherein said second shaft includes a square pillar portion and a cylindrical portion having a screw portion thereon.

* * * * *